May 1, 1962     J. P. GITS     3,031,722
METHODS OF MAKING MOLDED ARTICLES
Filed Nov. 27, 1957     2 Sheets-Sheet 1
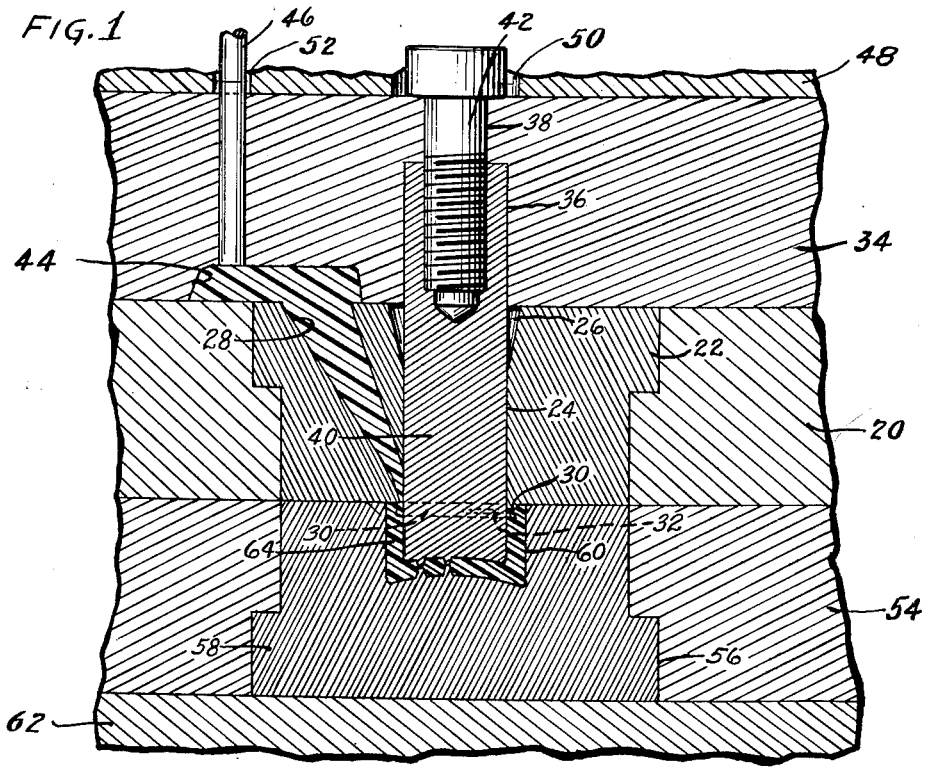
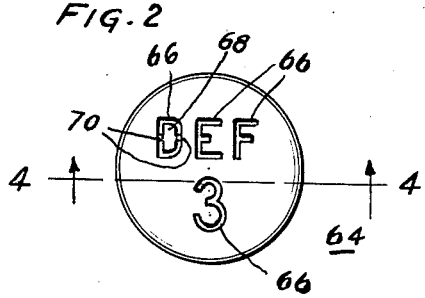
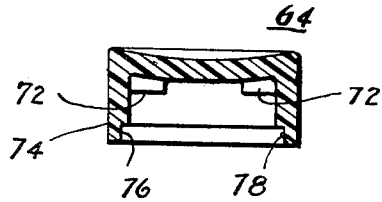
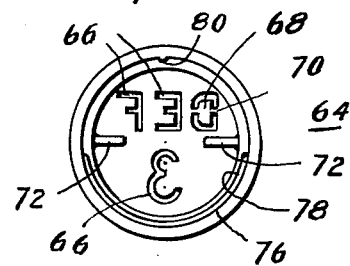
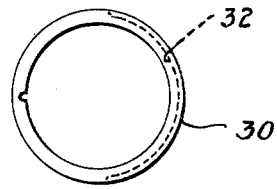
INVENTOR
JULES P. GITS
BY Rey Eilers ATTY.

May 1, 1962
J. P. GITS
3,031,722
METHODS OF MAKING MOLDED ARTICLES
Filed Nov. 27, 1957
2 Sheets-Sheet 2
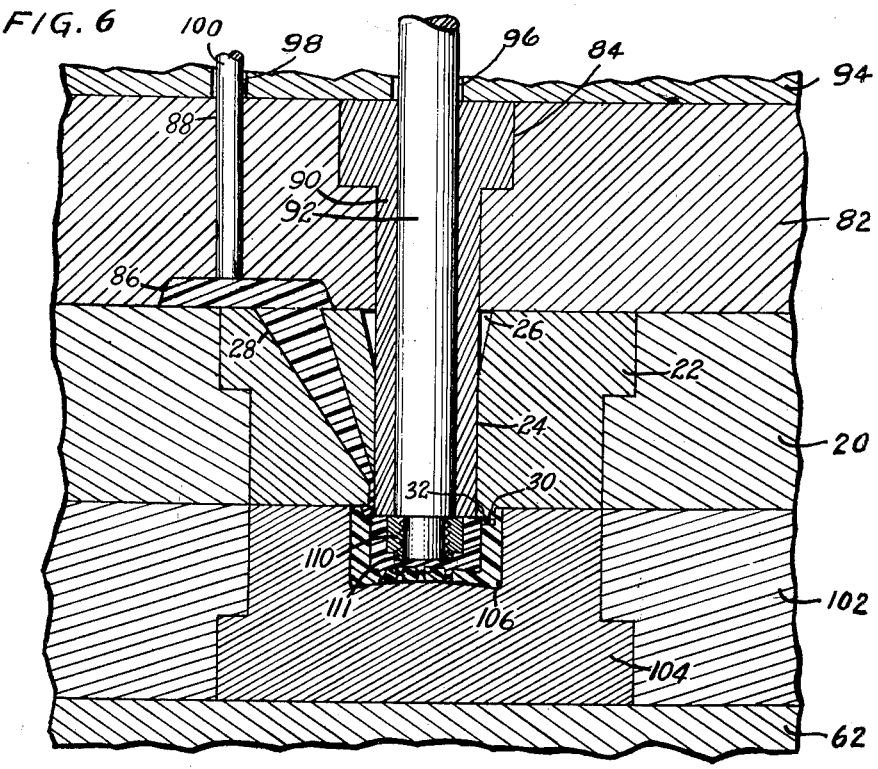
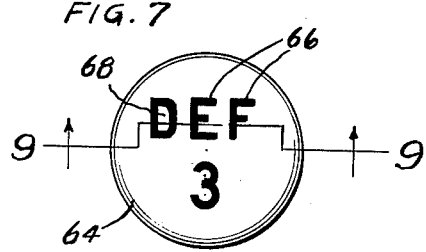
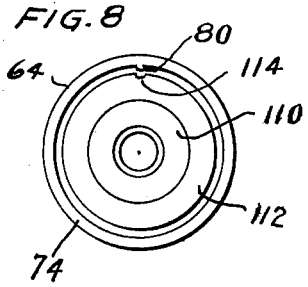
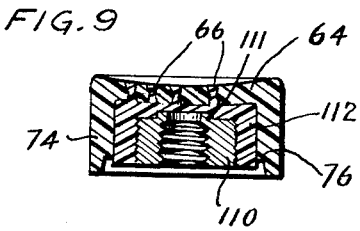
INVENTOR
JULES P. GITS
BY Rey Eilers
ATT'Y.

United States Patent Office 3,031,722
Patented May 1, 1962

3,031,722
METHODS OF MAKING MOLDED ARTICLES
Jules P. Gits, 1003 Lathrop Ave., River Forest, Ill., assignor of one-half to Joseph A. Gits, River Forest, Ill.
Filed Nov. 27, 1957, Ser. No. 699,387
4 Claims. (Cl. 18—59)

This invention relates to improvements in molded articles and methods of making same. More particularly, this invention relates to improvements in small molded articles and to improvement in methods of making such articles.

It is therefore an object of the present invention to provide an improved small molded article and to provide an improved method of making such article.

In the molding of an article from plastic material, it is customary to force molten plastic material into the cavity of a mold, to permit the molten plastic material to solidify, and to remove the molded plastic article from the mold. Where the molded plastic article is large, it is usually a simple and quick matter for the operator to grasp that article with a suitable tool and remove it from the mold. Where, however, the molded plastic article is small, it is not always simple and quick for the operator to remove that article from the mold. As a result, the manufacture of many small molded plastic articles has been difficult and slow; and consequently, the cost of such small molded plastic articles has been high. The present invention reduces the cost of small molded plastic articles by providing a small molded plastic article that can be automatically freed from the mold as the mold is opened. It is therefore an object of the present invention to provide a small molded plastic article that can be automatically freed from the mold as the mold is opened.

The small molded plastic article provided by the present invention is formed in two "shots"; part of that article being formed by the "first shot" and the rest of that article being formed by the "second shot." If the "first shot" had to be removed individually from the "first shot" mold and thereafter individually mounted in the "second shot" mold, the cost of that article would be high. The present invention obviates any such high cost by providing the "first shot" mold with a transfer plate that subsequently becomes part of the "second shot" mold. That transfer plate is provided with a holding surface which will maintain that "first shot" in assembled relation with it, as the transfer plate is separated from the "first shot" mold and made a part of the "second shot" mold; and hence that transfer plate obviates all need of individual removal of the "first shot" from the "first shot" mold and all need of individual mounting of that "first shot" in the "second shot" mold. It is therefore an object of the present invention to provide a "first shot" mold with a transfer plate that can transport a "first shot" to the "second shot" mold.

The holding surface of the transfer plate provided by the present invention must be capable of holding the "first shot" so tightly that the opening up of the "first shot" mold will not separate that "first shot" from that transfer plate; and yet that holding surface must be capable of readily releasing the completed molded plastic article when the "second shot" mold is opened. The present invention provides such a holding surface; and that surface is a small groove at the exterior of an annular projection on the transfer plate. Not only is the groove small but it is less than three hundred and sixty degrees in angular extent, and therefore the plastic material that solidifies in that groove can be readily separated from the finished molded article and can also be readily separated from the groove. It is therefore an object of the present invention to provide a transfer plate, usable as part of a "first shot" mold and also usable as part of a "second shot" mold, with an annular projection which has a small groove that is less than three hundred and sixty degrees in angular extent.

The annular projection, on the transfer plate provided by the present invention, has the innermost end of the ingate for molten plastic material at its interior. The exterior of that annular projection forms a skirt for the "first shot," and that skirt will conceal the tag portion of the solidified plastic sprue after the major part of the sprue has been broken away. The innermost end of the ingate for the molten plastic material is small in cross section, and therefore the solidified plastic sprue will be readily frangible and will readily permit separation of the completed molded article from the transfer plate. It is therefore an object of the present invention to provide a transfer plate with an annular projection that has an ingate at the interior thereof and that forms a skirt at the exterior thereof.

The ingate through which the molten plastic material of the "first shot" flows into the cavity for the "first shot" is the same ingate through which the molten plastic material of the "second shot" subsequently flows into the cavity for the "second shot." As a result, the solidified plastic sprue of the "second shot" will also be readily frangible and will also be hidden from view by the skirt.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing,

FIG. 1 is a sectional view, on an enlarged scale, of a mold that can be used to form the "first shot" for a push button for a dial telephone, FIG. 2 is a plan view, on a still larger scale, of the "first shot" for such push button, FIG. 3 is a bottom view of the "first shot" shown in FIG. 2, FIG. 4 is a sectional view through the "first shot" of FIG. 2, and it is taken along the plane indicated by the line 4—4 in FIG. 2, FIG. 5 is a bottom view of the annular projection on the transfer plate of the mold of FIG. 1, FIG. 6 is a sectional view, on said enlarged scale, of a mold that can be used to form the completed push button for the dial telephone, FIG. 7 is a plan view, on said still larger scale, of the completed push button, FIG. 8 is a bottom view of the completed push button, and FIG. 9 is a sectional view through the push button of FIGS. 7 and 8, and it is taken along the broken plane indicated by the line 9—9 in FIG. 7.

Referring to the drawing in detail, the numeral 20 denotes a supporting plate for a mold in which the "first shot" of a push button for a dial telephone can be formed. That supporting plate will also be incorporated into the mold in which the "second shot" of that push button will be formed; and hence the plate 20 is a transfer plate. The plate 20 has a central, shouldered recess to accommodate a shouldered insert 22; and that insert has a central cylindrical passage 24, has a conical chamfer 26 at the upper end of the passage 24, has an ingate 28, has an annular projection 30 concentric with the cylindrical passage 24, and has a small, circumferentially extending groove 32 at the exterior of that projection. The groove 32 is small in cross section, and it has an angular extent of less than three hundred and sixty degrees—being slightly less than one hundred and eighty degrees in angular extent. The innermost end of the ingate 28 is at the interior of the annular projection 30, and it has a very small cross section, as shown by FIGS. 1, 5 and 6.

A supporting plate 34 is disposed above, but in abutting relation to, the transfer plate 20; and that plate has a pair of contiguous recesses 36 and 38 of different diameters. The larger diameter recess 36 accommodates the upper end of a cylindrical die 40, and the smaller diameter recess 38 accommodates the shank of a machine screw 42. The head of the screw 42 abuts the upper face of the plate 34, and the threaded shank of that screw extends into a drilled and tapped opening in the upper end of the die 40. The lower end of the die 40 extends downwardly through the passage 24 in the insert 22 of transfer plate 20, and extends beyond the annular projection 30 on that insert. The screw 42 fixedly secures the die 40 to the plate 34.

The plate 34 has a passage 44 in it, and that passage communicates with the ingate 28 of the insert 22 carried by the transfer plate 20. Molten plastic material can flow through the passage 44, and into the ingate 28. An ejector pin 46 is mounted in a passage in the plate 34, and that ejector pin can be moved longitudinally downward to eject solidified plastic material from the passage 44 in the plate 34.

A back-up plate 48 is disposed above but in abutting relation with the plate 34; and that back-up plate has an opening 50 to accommodate the head of the screw 42. The plate 48 also has an opening 52 to accommodate the ejector pin 46.

The numeral 54 denotes a supporting plate which is disposed below but in abutting relation to the transfer plate 20; and that plate 54 has a central, shouldered recess 56. The recess 56 accommodates a shouldered insert 58; and the insert 58 abuts the insert 22 carried by the transfer plate 20. The insert 58 has a recess 60 which coacts with the die 40, the insert 22 and the annular projection 30 on that insert to define a cavity in which the "first shot" 64 for a push button of a dial telephone is formed. The bottom face of the die 40 is engraved and the bottom of the recess 60 of insert 58 is also engraved. The engraving on the die 40 and at the bottom of recess 60 form indicia-defining recesses 66 in the "first shot" 64. In the particular modification shown by FIG. 2, the engraving on the die 40 and at the bottom of recess 60 form the letters D, E and F and also form the numeral 3.

The supporting plate 54 and the insert 58 are underlain by a back-up plate 62. That back-up plate and the other elements of the mold will be suitably mounted in a standard and customary molding machine for plastic material. When molten plastic material is then introduced into the passage 44 of the supporting plate 34, that material will fill that passage and pass through the ingate 28 into the cavity defined by the die 40, the recess 60, the insert 22 and the annular projection 30. That molten plastic material will flow into engagement with the sides of the engraving on the bottom of die 40 and at the bottom of recess 60, will fill the cavity, and will also fill the groove 32 in the annular projection 30. In doing so, that plastic material will form the "first shot" 64 shown in FIGS. 2–4.

That "first shot" has the indicia-defining openings 66 therein; those openings defining the letters D, E and F and the numeral 3. In addition, the "first shot" 64 has an "island" 68 in the D; and that "island" is held in position by struts 70. Those struts are disposed rearwardly of the front face of the "first shot" 64. In addition, the "first shot" 64 has two radially directed webs 72 that extend rearwardly from the rear surface of the face of that "first shot." A cylindrical skirt 74 extends rearwardly from the outer periphery of the front surface of the face of the "first shot" 64, and an annular recess 76 is provided at the bottom of the interior of that skirt. The "first shot" 64 will also have a narrow ridge 78 at the interior of the recess 76. Furthermore, that "first shot" will have a tag portion 80 of the sprue formed in the ingate 28. Because the cross section of the innermost end of the ingate 28 in insert 22 is so small, the sprue of material formed therein will break at that point and will leave only a very small tag portion 80. That tag portion will not only be small, but it will be hidden from view by the skirt 74.

The "first shot" 64 will not become separated from the transfer plate 20 as the supporting plate 54 and its back-up plate 62 are moved away from that transfer plate; the ridge 78 and the groove 32 preventing any such separation. That ridge and groove will continue to hold the "first shot" in assembled relation with the transfer plate 20 when that plate is moved away from the plate 34 to break the solidified plastic sprue in the ingate 28. That solidified plastic sprue will break at the innermost end of the ingate 28; and that sprue will telescope out of the ingate 28 as the transfer plate 20 is fully separated from the supporting plate 34. As a result, when the transfer plate 20 is incorporated into the "second shot" mold, it has the "first shot" 64 supported on its annular projection 30; and the passage 24 and the ingate 28 of the insert 22 are completely empty.

The "second shot" mold is shown in FIG. 6, and it includes the transfer plate 20 with its insert 22. That mold also includes a supporting plate 82 which has a shouldered central recess 84, a passage 86 and an ejector-receiving passage 88. The recess 84 accommodates a shouldered sleeve 90; and that sleeve, in turn, accommodates an ejector rod 92 which has a reduced diameter portion at the lower end thereof. That reduced diameter portion of rod 92 is circular in cross section, and it has a smooth exterior. The passage 86 communicates with the ingate 28 and can conduct molten plastic material to it.

A back-up plate 94 overlies, and is in abutting relation with, the supporting plate 82. The plate 94 has a passage 96 that accommodates the ejector rod 92 while holding the shouldered sleeve 90 against separation from the supporting plate 82. The back-up plate also has a passage 98 which accommodates an ejector pin 100. That pin extends to the passage 86 in plate 82 and can eject solidified plastic material from that passage.

The numeral 102 denotes a supporting plate that underlies and abuts the transfer plate 20. That plate has a central, shouldered recess; and that recess accommodates a shouldered insert 104. A recess 106 is provided in the insert 104, and that recess is in register with the passage 24 and annular projection 30 of insert 22. The recess 106 is formed to accommodate the "first shot" 64 carried by the annular projection 30 on the insert 22.

The numeral 62 denotes a back-up plate which underlies and abuts the supporting plate 102 and its insert 104. The "second shot" mold of FIG. 6 can be suitably mounted in a standard and usual plastic molding machine.

Prior to the time the transfer plate 20 is assembled with the rest of the "second shot" mold, and externally knurled and internally threaded metal insert 110 is telescoped onto the small diameter lower end of the ejector rod 92. The insert 110 has an annular projection 111 at one end thereof; and that projection has an outer diameter which is slightly smaller than the distance between the webs 72 of the "first shot" 64, and that projection has an inner diameter that enables it to snugly engage the small diameter lower end of the ejector rod 92. The internal diameter of the thread of insert 110 is slightly larger than the inner diameter of projection 111, and thus it is large enough to enable that thread to telescope freely onto that end of ejector rod 92. The snug engagement between the annular projection 111 of insert 110 and the lower diameter end of ejector rod 92 will help prevent accidental separation of the insert 110 from the ejector rod 92, and in addition that rod will be set horizontal to keep that insert from falling off—the "second shot" mold having been rotated ninety degrees, in the clockwise direction from its normal position to the position of FIG. 6, to facilitate a full showing of that mold.

As the passage 24 of transfer plate 20 and the "first shot" 64 are telescoped over the sleeve 90 and the insert 110, respectively, the webs 72 of the "first shot" 64 engage the insert 110 and force it solidly against the shoulder defined by the two separate diameters of the rod 92. In turn, that shoulder will coact with those webs and that insert to force the "first shot" 64 downwardly into intimate engagement with the bottom of the cavity 106 in the insert 104. The webs 72 are sturdy and rugged but they can yield slightly as the "second shot" mold is clamped together; and that yielding enables those webs to provide the force needed to hold the "first shot" 64 in intimate engagement with the bottom of cavity 106. Further, the resulting intimate engagement between the insert 110 and the shoulder of rod 92 coacts with the snug engagement between projection 111 and the reduced diameter lower end of rod 92 to keep material of the "second shot" from engaging and lodging in the thread of insert 110.

The molten plastic material of the "second shot" 112 can be introduced into the ingate 28 through the passage 86. That material will fill the passage 86 and the ingate 28, and will then pass into the recess defined by the exterior of the threaded insert 110, by the interior of the "first shot" 64, and by the shoulder of rod 92. In doing so, the material of the "second shot" 112 will intimately bond the threaded insert 110 to the "first shot" 64 and will also fill the indicia-defining recesses 66; and the knurling at the exterior of the insert 110 will assure a highly intimate engagement between that insert and the "second shot" 112. In filling the recesses 66, the "second shot" 112 will surround and embed the "struts" 70. The "second shot" 112 will thus render the "struts" 70 invisible in the finished molded article, as indicated particularly in FIG. 7.

As indicated in FIG. 9, the "second shot" 112 extends downwardly below the uppermost limit of the recess 76 in the "first shot" 64; and therefore that "second shot" is partially coextensive with the recess 76. However, the bottom of the "second shot" 112 is spaced above the level of the bottom of the skirt 74 of the "first shot."

After the "second shot" 112 has solidified, the supporting plate 102 and its insert 104 are moved away from the transfer plate 20 and its insert 22. The completed molded article will continue to remain in assembled relation with the annular projection 30 of the transfer plate 20, because of the engagement between groove 32 and ridge 78. Thereafter, however, the ejector rod 92 will be moved forwardly and the supporting plate 82 will be moved rearwardly; thereupon shearing the ridge 78 from the wall of recess 76, and severing the sprue in ingate 28. Because that ingate has a very small cross section at its innermost end, the sprue of the "second shot" severs at that point and leaves a very short tag portion 114. That tag portion is adjacent the tag portion 80 of the "first shot"; and, like the tag portion 80, it is disposed within the recess 76 and is concealed by the skirt 74 of the "first shot" 64.

The shearing away of the ridge 78, and the severance of the "second shot" sprue, occur automatically as the "second shot" mold is opened up; and they completely free the completed molded article. Hence, they completely avoid all need of a separate operation to cut off the sprue. As the completed molded article drops out of the "second shot" mold, that article is ready to be packaged and sold.

Whereas the drawing and accompanying description have shown and described a preferred embodiment of the present invention, it should be apparent to those skilled in the art that various changes may be made in the form of the invention without affecting the scope thereof.

What I claim is:

1. The method of making a molded plastic article that has the tag portions of the sprues thereof concealed although constituting a part of an external surface of said article and that comprises molding a "first shot" of plastic material with a wall that defines a large central recess and that also defines a small recess, said large recess extending inwardly from one external surface of said "first shot" that will become an external surface of said article and said small recess being contiguous with said large recess and being immediately adjacent said one external surface of said "first shot," forming the sprue for said "first shot" so it terminates in said small recess and so the portion of said sprue within said small recess is of small cross section and is readily frangible, serving said sprue at a point within said small recess whereby the tag portion of said sprue is concealed by said wall, filling a substantial part of said large recess with "second shot" plastic material, forming the sprue for said "second shot" plastic material so it terminates in said small recess and so the portion of said sprue for said "second shot" plastic material which is within said small recess is of small cross section and is readily frangible, and serving said sprue for said "second shot" plastic material at a point within said small recess whereby the tag portion of said sprue for said "second shot" plastic material also is concealed by said wall.

2. The method of making a molded plastic article as "two shots" which comprises forming a "first shot" in a mold that includes a transfer plate with a shallow recess therein which can accommodate a portion of said "first shot" and thereby form a holding portion on said "first shot" that can prevent accidental separation of said "first shot" from said transfer plate, forming the said "first shot" so a portion thereof extends into said shallow recess in said transfer plate and forms a severable holding portion that can releasably maintain said "first shot" in assembled relation with said transfer plate, separating said transfer plate from said mold while said severable holding portion coacts with said shallow recess in said transfer plate to hold said "first shot" in assembled relation with said transfer plate and associating said transfer plate with a second and different mold so said "first shot" is within said second mold, applying a "second shot" to said "first shot" while said severable holding portion of said "first shot" coacts with said shallow recess in said transfer plate to hold said "first shot" in assembled relation with said transfer plate in said second and different mold, and thereafter ejecting that "two shot" article from said transfer plate, said ejection of said "two shot" article automatically severing said severable holding portion of said "first shot" from said "first shot" to free said "two shot" article from said transfer plate.

3. The method of making a molded plastic article as "two shots" which comprises forming a "first shot" in a mold that includes a transfer plate with an arcuate recess therein which can accommodate a portion of said "first shot" and thereby form an arcuate holding portion on said "first shot" that can prevent accidental separation of said "first shot" from said transfer plate, forming the said "first shot" so a portion thereof extends into said arcuate recess in said transfer plate and forms an arcuate severable holding portion that can releasably maintain said "first shot" in assembled relation with said transfer plate, separating said transfer plate from said mold while said arcuate severable holding portion coacts with said arcuate recess in said transfer plate to hold said "first shot" in assembled rleation with said transfer plate and associating said transfer plate with a second and different mold so said "first shot" is within said second mold, applying a "second shot" to said "first shot" while said arcuate severable holding portion of said "first shot" coacts with said arcuate recess in said transfer plate to hold said "first shot" in assembled relation with said transfer plate in said second and different mold, and thereafter ejecting that "two shot" article from said transfer plate, said ejection of said "two shot" article automatically severing said arcuate severable holding portion of said "first shot"

from said "first shot" to free said "two shot" article from said transfer plate, said arcuate severable holding portion of said "first shot" being an arcuate projection having an angular extent of less than three hundred and sixty degrees.

4. The method of making a molded plastic article with an open-ended insert, which has an internal thread extending through a portion of the interior thereof and which has an unthreaded portion between one of the open ends thereof and one end of said internal thread, that comprises forming a "first shot" wtih a recess therein, placing said open-ended insert within said recess so said one open end of said open-ended insert is adjacent the closed end of said recess in said "first shot," passing a shouldered ejector rod through said open-ended insert to enable the reduced diameter portion of said rod to coact with said unthreaded portion between said one open end of said open-ended insert and said one end of said internal thread to provide a seal at said one open end of said open-ended insert which will prevent the entry of "second shot" plastic material into the interior of said open-ended insert, causing the shoulder on said shouldered ejector rod to engage the other end of said open-ended insert and to coact with said other end of said open-ended insert to form a seal at said other end of said open-ended insert which will prevent the entry of "second shot" plastic material into the interior of said open-ended insert, introducing "second shot" plastic material into said recess of said "first shot" to bond the said one end and said sides of said open-ended insert to said "first shot" but without causing said "second shot" plastic material to enter the interior of said open-ended insert, and thereafter separating said shouldered ejector rod from said open-ended insert.

References Cited in the file of this patent
UNITED STATES PATENTS

| | | |
|---|---|---|
| 578,695 | Gibbs | Mar. 9, 1897 |
| 1,827,565 | De Reamer | Oct. 13, 1931 |
| 1,944,571 | Rahm | Jan. 23, 1934 |
| 2,040,235 | Bateholts | May 12, 1936 |
| 2,193,586 | Fischett | Mar. 12, 1940 |
| 2,345,371 | Amrine | Mar. 28, 1944 |
| 2,366,475 | Bartholomew | Jan. 2, 1945 |
| 2,443,826 | Johnson | June 22, 1948 |
| 2,475,375 | Clark | July 5, 1949 |
| 2,544,140 | Dofsen et al. | Mar. 6, 1951 |
| 2,615,203 | Du Pree | Oct. 28, 1952 |
| 2,652,470 | Batcheller | Sept. 15, 1953 |
| 2,722,720 | Karniol | Nov. 8, 1955 |
| 2,799,049 | Wilson | July 16, 1957 |
| 2,808,620 | Schmid et al. | Oct. 8, 1957 |

FOREIGN PATENTS

| | | |
|---|---|---|
| 270,555 | Switzerland | Sept. 15, 1950 |
| 529,257 | Great Britain | Nov. 18, 1940 |